(12) United States Patent
Ohtake

(10) Patent No.: US 7,633,278 B2
(45) Date of Patent: Dec. 15, 2009

(54) SWITCHING REGULATOR

(75) Inventor: Hisao Ohtake, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 276 days.

(21) Appl. No.: 11/785,307

(22) Filed: Apr. 17, 2007

(65) Prior Publication Data
US 2008/0007238 A1   Jan. 10, 2008

(30) Foreign Application Priority Data
Jul. 10, 2006 (JP) .............................. 2006-188814

(51) Int. Cl.
*G05F 1/40* (2006.01)
(52) U.S. Cl. ...................... 323/282; 323/222
(58) Field of Classification Search ......... 323/282–290, 323/222, 224, 225; 363/16–20; 364/484–487
See application file for complete search history.

(56) References Cited

U.S. PATENT DOCUMENTS 4,595,992 A  *  6/1986  Drogin ........................ 702/79
6,310,469 B1    10/2001 Bentolila et al.
7,394,231 B2 *  7/2008  Flatness et al. ............. 323/259

FOREIGN PATENT DOCUMENTS

| JP | 2002-044939 | 2/2002 |
| JP | 2006-174626 | 6/2006 |

* cited by examiner

*Primary Examiner*—Rajnikant B Patel
(74) *Attorney, Agent, or Firm*—Volentine & Whitt, P.L.L.C.

(57) ABSTRACT

In a replica circuit, a potential simulating a waveform of current passing through an inductor is generated as a referential potential. A timing when the referential potential and an output potential become substantially the same as each other and a timing when the current passing through the inductor becomes substantially zero are set to substantially correspond to each other. A control circuit turns off an NMOS transistor at a time when the current passing through the inductor becomes lower than 0 [A]. At this time, a PMOS transistor is already turned off. Therefore, the current passing through the inductor can be reliably prevented from flowing in reverse to the switch element.

9 Claims, 10 Drawing Sheets

500

F I G. 4
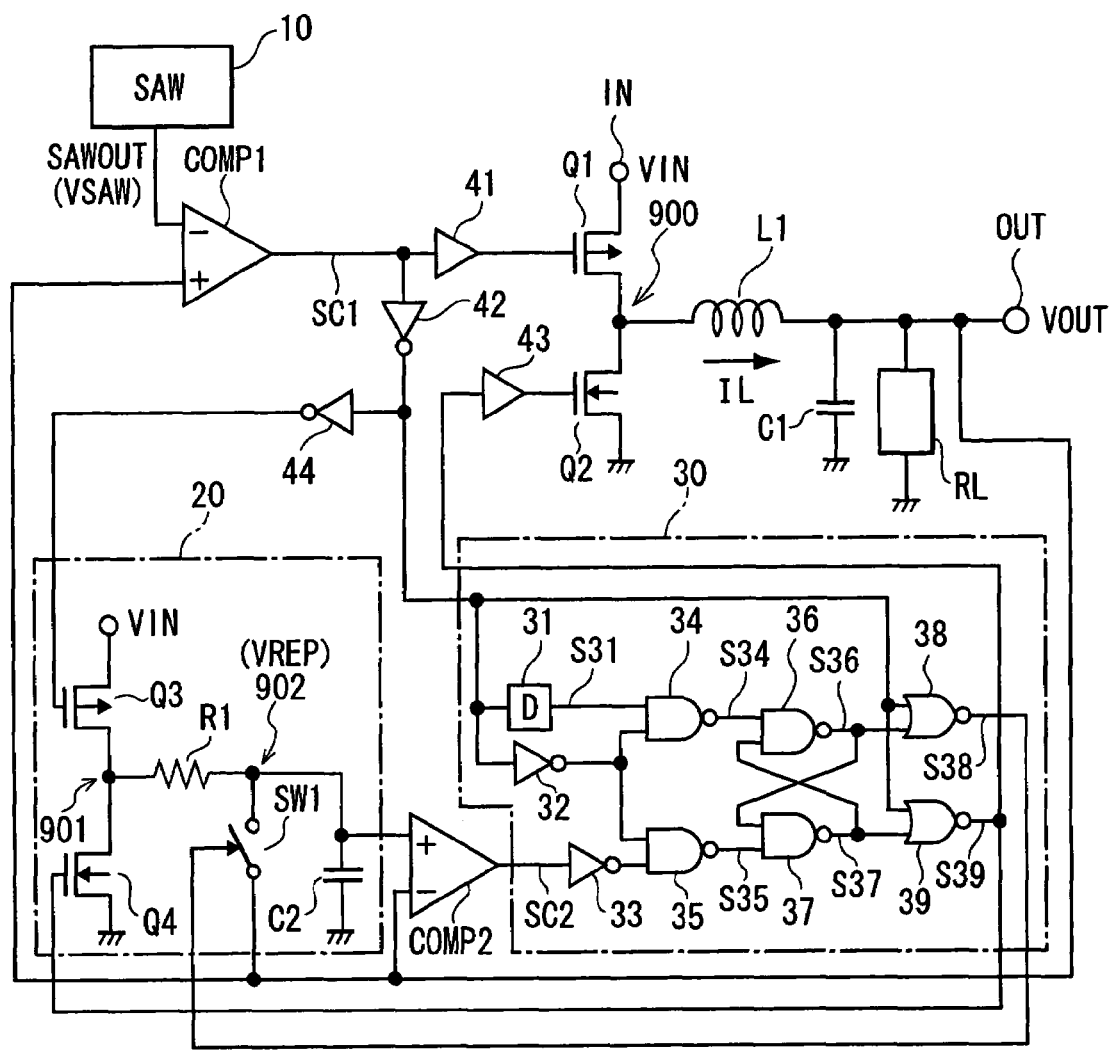

F I G. 9
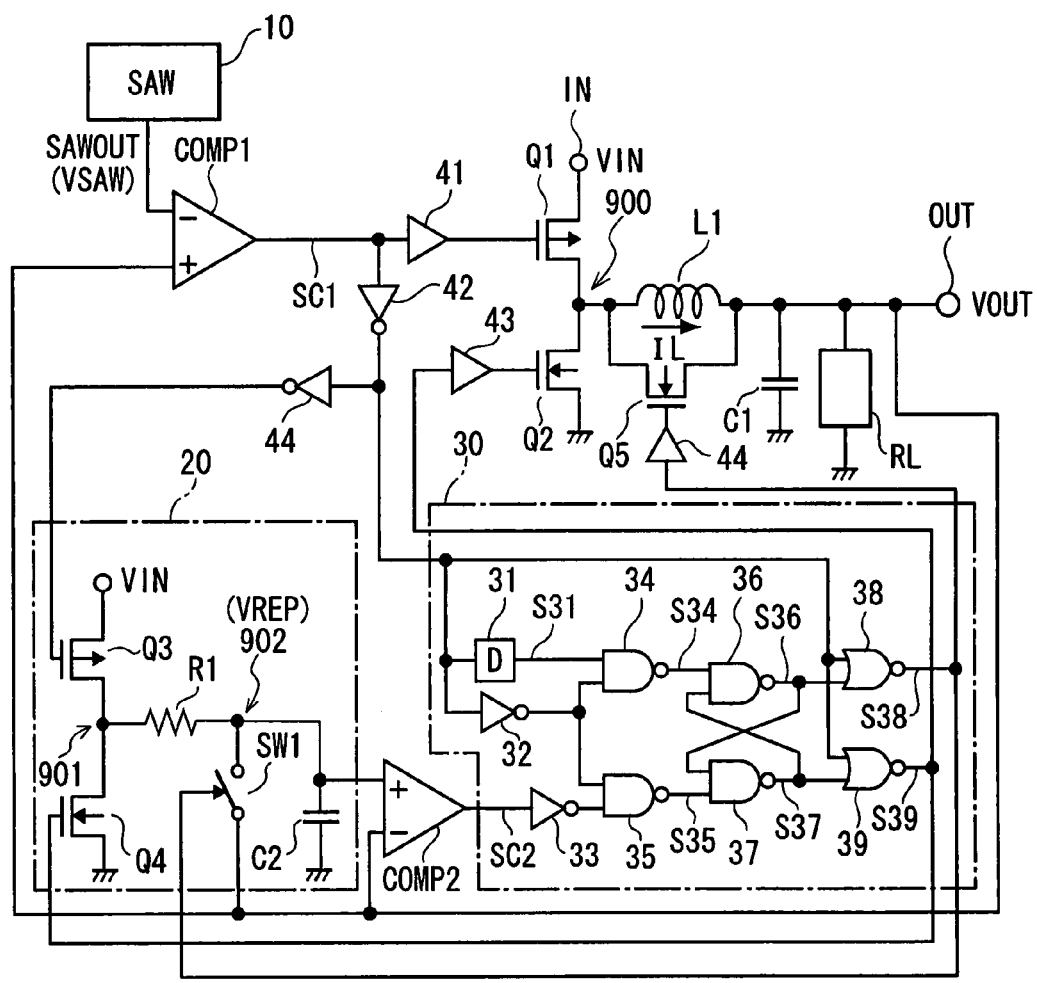

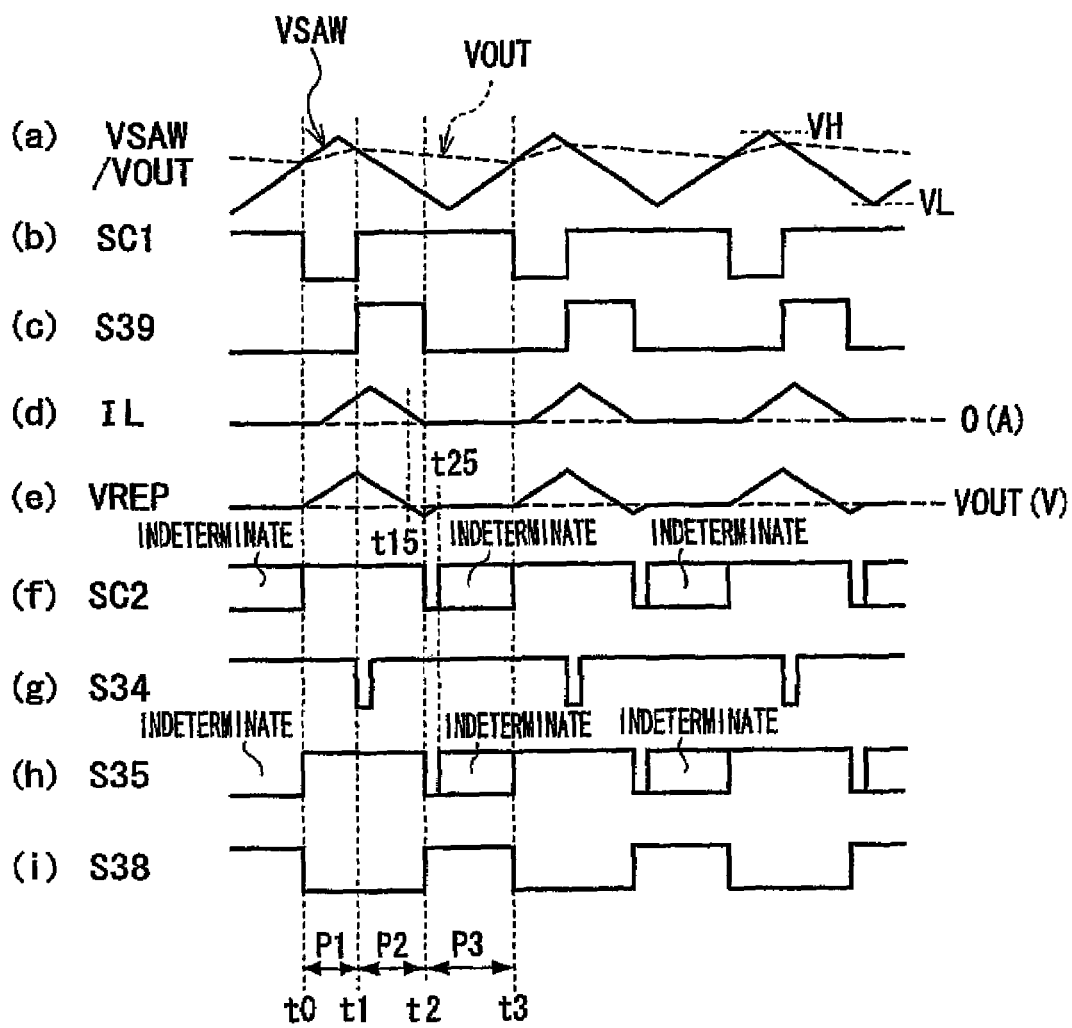

SWITCHING REGULATOR

CROSS-REFERENCE TO RELATED APPLICATION

This application claims priority under 35 USC 119 from Japanese Patent Application No. 2006-188814, the disclosure of which is incorporated by reference herein.

BACKGROUND OF THE INVENTION

1. Field of the Invention

The present invention relates to a non-isolated switching regulator.

2. Description of Related Art

As disclosed in Japanese Patent Application Laid-Open No. 2002-44939, a switching regulator, which includes two switching elements (PMOS transistor and NMOS transistor) connected to each other in a push-pull manner for applying alternating current to an inductor is known as a conventional switching regulator. This kind of switching regulator preferably has a function that prevents the current passing through the inductor from flowing in reverse to the NMOS transistor, particularly when the output of the switching regulator has a light load. As a result of this function, power loss generated by the reverse flow of current due to the ON resistance of the NMOS, can be reduced. One technique to prevent current passing through the inductor from flowing reverse includes monitoring a potential of a terminal of the NMOS transistor and turning off the NMOS transistor when the monitored potential is lower than the ground potential.

In general, switching regulators are designed such that the two switching elements (PMOS transistor and NMOS transistor) connected to each other in a push-pull manner have extremely small ON resistance, in order to improve efficiency. Therefore, the potential generated at the terminal of the NMOS transistor connected to the inductor (hereinafter, the "inductor side terminal of the NMOS transistor"), i.e., generated by the ON resistance of the NMOS transistor, is extremely close to the ground potential. Thus, when the potential at the inductor side terminal of the NMOS transistor is compared with the ground potential by a comparator, results of the comparison are significantly affected by the offset variation of the comparator. Accordingly, the problem has existed that the timing when the current passing through the inductor flows in reverse cannot be detected precisely. In view of the above, there has been a need for a switching regulator that can reliably prevent the current passing through the inductor from flowing in reverse to the switching element.

SUMMARY OF THE INVENTION

According to an aspect of the present invention, there is provided a switching regulator including:

a first signal generator that generates a triangular wave;

a first comparator that compares an output potential and a potential of the triangular wave;

a first switch element having one terminal set to have a first reference potential and another terminal connected to a first node, the first switch element operating in response to a comparison result of the first comparator;

a second switch element having one terminal set to have a second reference potential that is lower than the first reference potential, and another terminal connected to the first node, the second switch element operating in response to the comparison result of the first comparator;

an inductor disposed between the first node and an output terminal;

a second signal generator that generates a referential potential that simulates a waveform of a current passing through the inductor, such that at least a timing when the current passes through the inductor becomes substantially zero and a timing when the referential potential becomes substantially the same as the output potential correspond; and a switch controlling portion that sets both of the first switch element and the second switch element to an OFF state when the referential potential becomes lower than the output potential.

In the switching regulator of the present invention, the second signal generator generates a referential potential, which simulates a waveform of the current passing through the inductor, and the timing when the current passing through the inductor becomes zero and the timing when the reference potential becomes substantially the same as the output potential correspond. The switch controlling portion turns both of the first switch element and the second switch element off when the referential potential becomes lower than the output potential. Here, since the referential potential is set to be substantially the same as the output potential, when the referential potential and the output potential are compared by a comparator or the like, there is no need to consider the influence of offset variations of the comparator. Therefore, the time at which a current passing through the inductor is zero can be precisely detected.

According to the switching regulator of the present invention, the time at which a current passing through the inductor is zero can be precisely detected. Therefore, the current passing through the inductor can be reliably prevented from flowing in reverse to the switch element.

BRIEF DESCRIPTION OF THE DRAWINGS

Preferred exemplary embodiments of the present invention will be described in detail based on the following figures, wherein:

FIG. 4 is a circuit diagram of a switching regulator according to a first embodiment;

FIG. 9 is a circuit diagram of a switching regulator according to a second embodiment;

FIG. 11 is a timing chart showing an operation of the switching regulator of the third embodiment at the time of a light load operation.

DETAILED DESCRIPTION OF THE INVENTION

Before explaining exemplary embodiments of the present invention, a conventional switching regulator is explained below as a referential device to facilitate clear description of the configurations and operational features of the embodiments.

—Referential Device—

Figure 1:
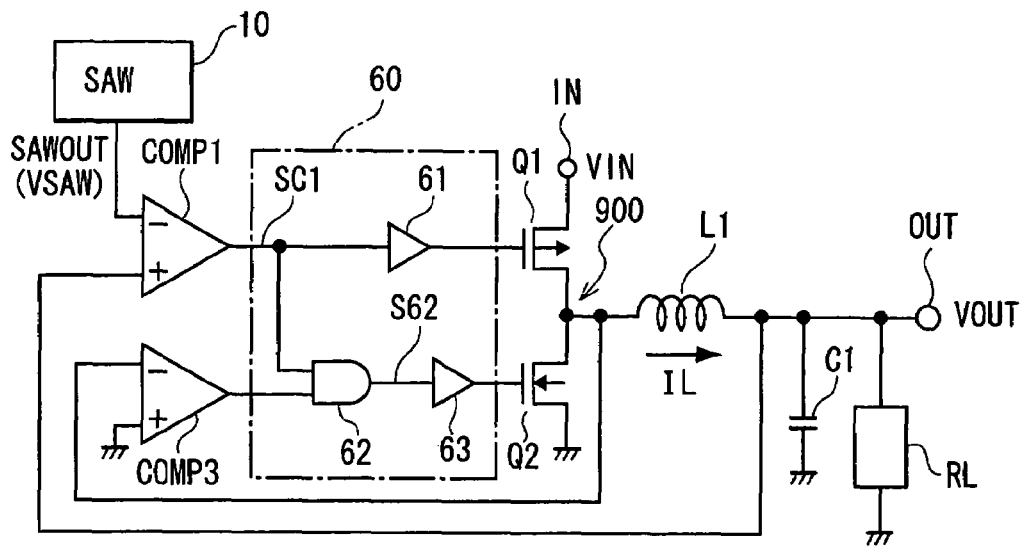
FIG. 1 is a circuit diagram illustrating a referential device.

FIG. 1 illustrates a referential device 500 as an example of a conventional switching regulator.

The referential device 500 is a step-down converter (step-down converter) which converts an input potential VIN to an output potential VOUT (<VIN). The referential device 500 comprises: a triangular wave generating circuit 10; two comparators COMP1 and COMP3; a controlling circuit 60; two transistors connected to each other in push-pull manner (PMOS transistor Q1 and NMOS transistor Q2); an inductor L1; and a smoothing capacitor C1. Further, at the output terminal OUT, a load RL is connected.

The triangular wave generating circuit (SAW) 10 generates a triangular wave SAWOUT (potential VSAW) having a peak potential VH and a bottom potential VL and a predetermined frequency. The triangular wave SAWOUT generated by the triangular wave generating circuit 10 is input to an inverting input terminal of the comparator COMP1. Further, the output potential VOUT of the referential device 500 is fed back to a non-inverting input terminal of the comparator COMP1. The comparator COMP1 compares the potential of the triangular wave VSAW and the output potential VOUT, and outputs the results of the comparison to the controlling circuit 60. In addition, a potential V900 of a node 900, i.e., a drain potential of the NMOS transistor, is applied to a non-inverting input terminal of the other comparator COMP3. A ground potential VGND is applied to the non-inverting input terminal of the comparator COMP3. The comparator COMP3 compares the potential V900 and the ground potential VGND, and outputs the results of the comparison to the controlling circuit 60.

The controlling circuit 60 comprises buffers 61, 63 and an AND circuit 62, and controls the PMOS transistor Q1 and the NMOS transistor Q2 based on the results input from the two comparators COMP1 and COMP3.

The source of the PMOS transistor Q1 is connected to the input terminal IN having potential VIN and the drain of the PMOS transistor Q1 is connected to the node 900. The PMOS transistor Q1 is operated by an output signal of the buffer 61 applied to the gate of the PMOS Q1. The ground potential VGND is applied to the source of the NMOS transistor Q2 and the drain of the NMOS transistor Q2 is connected to the node 900. The NMOS transistor Q2 is operated by an output signal of the buffer 63 applied to the gate of the NMOS Q1. An inductor L1 is provided between the node 900 and the output terminal OUT. A smoothing condenser C1 having one terminal grounded is connected between the inductor L1 and the output terminal OUT.

Figure 2:
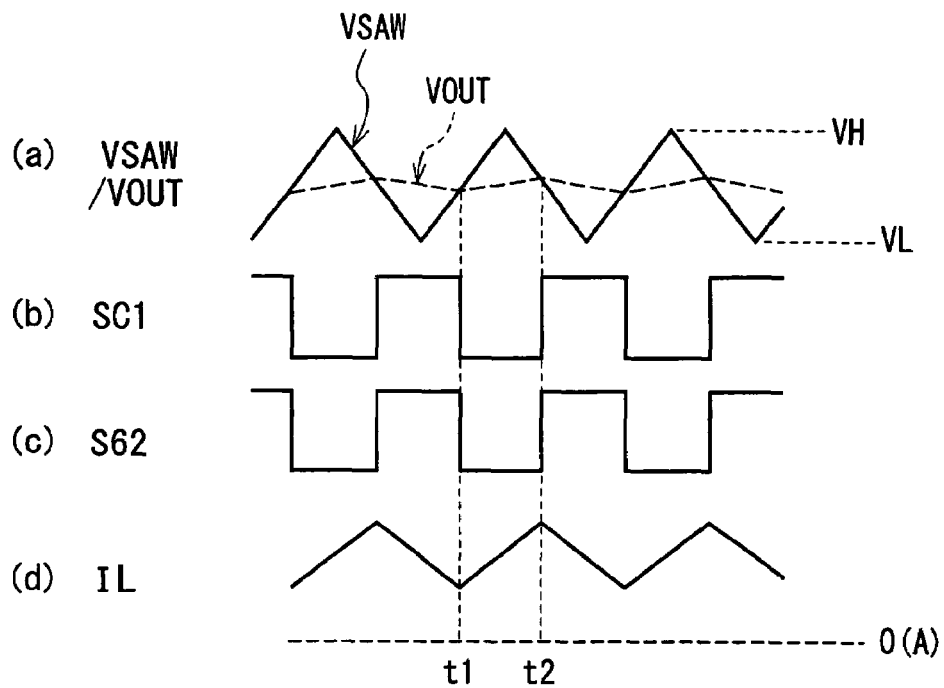
FIG. 2 is a timing chart showing an operation of the referential device at the time of a heavy load operation.
Figure 3:
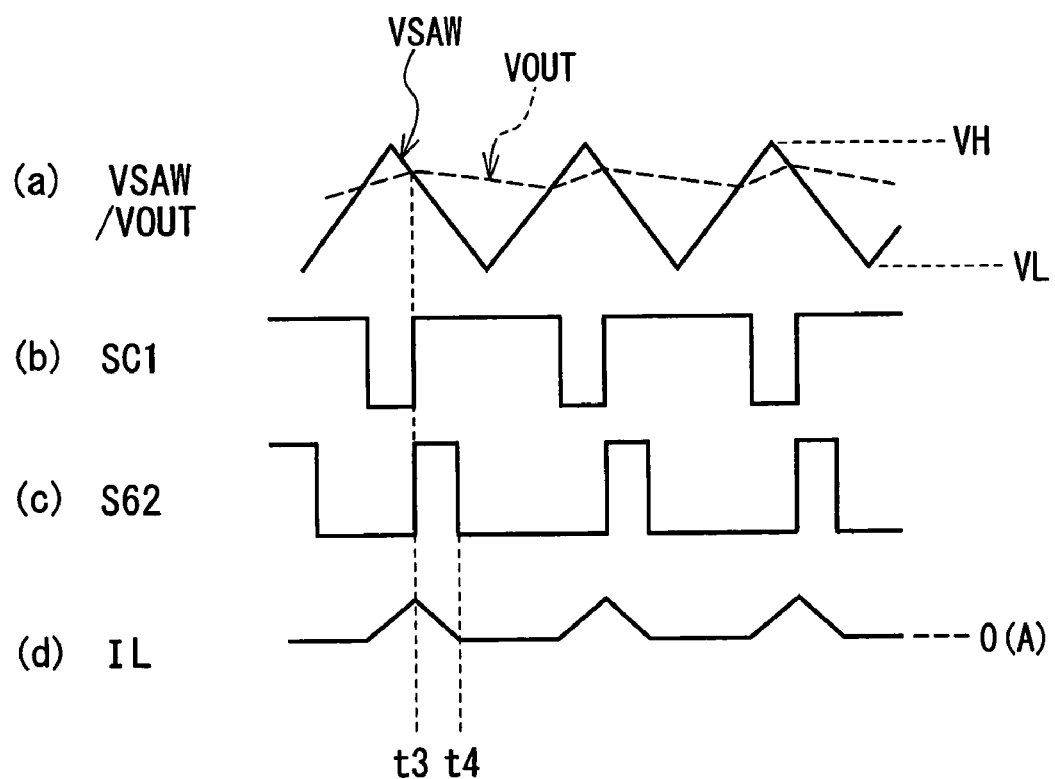
FIG. 3 is a timing chart showing an operation of the referential device at the time of a light load operation.

Next, operation of the referential device 500 is explained with reference to FIGS. 2 and 3. The operation state of the referential device can be classified as a heavy load mode or a light load mode in accordance with a load RL applied to the output terminal. The heavy load mode is an operation state in which impedance of the load at the output side is small. In contrast, the light load mode is an operation state in which impedance of the load at the output side is large, and the current passing through the inductor L1 is smaller than that in the heavy load mode. FIGS. 2 and 3 are timing charts respectively showing an operation in the heavy load mode and the light load mode. In each of the drawings, (a) indicates a triangular wave potential VSAW and an output potential VOUT, (b) indicates an output signal SC1 of the comparator COMP1, (c) indicates an output signal S62 of the AND circuit 62, and (d) indicates a current IL passing through the inductor L1.

First, the heavy load mode is explained.

In the heavy load mode, when the output potential VOUT is lower than the potential VSAW of the triangular wave SAWOUT, the output signal SC1 of the comparator COMP1 becomes low level (L level; time t1 in FIG. 2) and the control circuit 60 turns on the PMOS transistor Q1. Therefore, a current IL flows from the input terminal IN through the PMOS transistor Q1 to the inductor L1, and the output potential VOUT of the output terminal OUT rises.

At this time, since the potential V900 of the node 900 positioned at the output of the PMOS transistor Q1 is higher than the ground potential VGND, the comparator COMP3 applies the L level potential to the control circuit 60 (AND circuit 62). Thus, the NMOS transistor Q2 turns off since the signal S62 is L level.

When the output potential VOUT rises to a potential that is higher than the potential VSAW of the triangular wave SAWOUT, the output signal SC1 of the comparator COMP 1 becomes high level (H level), at time t2 in FIG. 2. Therefore, the control circuit 60 turns off the PMOS transistor Q1. At this time, the potential V900 of the node 900 becomes lower than the ground potential VGND since the inductor L1 acts to keep the current flowing. Therefore, the comparator COMP 3 outputs the H level, the output signal S62 of the AND circuit 62 becomes H level, and the NMOS transistor Q2 turns on. Thus, one of the terminals of the inductor L1 is connected to the ground via the NMOS transistor Q2. Accordingly, the output potential VOUT of the output terminal OUT become lower and the current IL decreases.

To summarize, in the heavy load mode, as shown in FIG. 2, the current passing through the inductor L1 increases when the signal SC1 is at the L level, i.e., when the PMOS transistor Q1 turns on, and the current passing through the inductor L1 decreases when the signal S62 is at the H level, i.e., when the NMOS transistor Q2 turns on.

Next, the light load mode is explained.

In the light load mode, compared with the heavy load mode, the current passing through the inductor L1 is totally reduced.

Therefore, in FIG. 3, after the NMOS transistor Q2 turns at time t3 when the signal SC1 becomes H level, as the current LI decreases to beyond 0 A, the current LI flows in reverse.

When the current IL flows in reverse, the potential V900 of the node 900 becomes higher than the ground potential VGND due to the ON resistance of the NMOS transistor Q2.

In the referential device 500, when the comparator COMP 3 detects that the potential V900 of the node 900 is higher than the ground potential VGND, the signal S62 becomes L level, at time t4 in FIG. 3.

Therefore, the NMOS transistor Q2 turns off and the current IL is prevented from flowing in reverse after time t4.

As described above, the referential device 500 detects whether the current IL passing through the inductor L1 is flowing in reverse based on the comparison of the potential V900 of the node 900 and the ground potential VGND in the light load mode. However, the precision of the detection is not high. This is because the offset variation of the comparator COMP3 significantly affects the detection of whether the current IL is flowing in reverse. In general, switching regulators are designed with a view to improved efficiency such that the NMOS transistor Q2, which is a switching transistor, is designed to have an extremely small ON resistance. Therefore, the potential V900 of the node 900 is close to the ground potential VGND. Therefore, the detection is easily affected by the offset variation of the comparator COMP3 and even when the potential V900 is higher than the ground potential VGND, there are cases in which the output of the comparator COMP3 does not become L level.

Next, exemplary embodiments of the present invention will be described. In the exemplary embodiments, the configuration of the above-described referential device is referred to as necessary First Embodiment A switching regulator according to a first exemplary embodiment of the present invention will be described below. The switching regulator 1 of the first aspect is a step-down converter that converts an input potential VIN (first reference potential) to an output potential VOUT (<VIN), the same as the above-described referential device 500. FIG. 4 is a circuit diagram showing a switching regulator of the present embodiment. Elements identical to those of the referential device 500 shown in FIG. 1 are indicated by the same numerals and description thereof is omitted. Here, the ground potential VGND corresponds to a second reference potential in the present embodiment.

[Configuration]

The configuration of the switching regulator 1 of the present embodiment will be described below mainly by focusing on differences from the referential device 500.

The switching regulator 1 comprises: a triangular wave generating circuit 10 (first signal generating portion); a comparator COMP1 (first comparator); two transistors connected to each other in a push-pull format (PMOS transistor Q1 (first switching element) and NMOS transistor Q2 (second switching element)); an inductor L1; and a smoothing capacitor C1. That is, the basic elements of the switching regulator are to the same as those of the referential device 500.

In contrast, the switching regulator 1 is different from the referential device 500 in that the switching regulator 1 further comprises: buffers 41 and 43; inverters 42 and 44; a comparator COMP2 (second comparator); a replica circuit 20 (second signal generating portion); and a control circuit 30 (switch controlling portion).

These elements that are different from those of the referential device 500 are provided in order to improve the detection precision of the reverse flow of the current IL passing through the inductor L1 in the light load mode over the detection precision of the referential device 500.

[Exemplary Configuration of Triangular Wave Generating Circuit 10]

Figure 5:
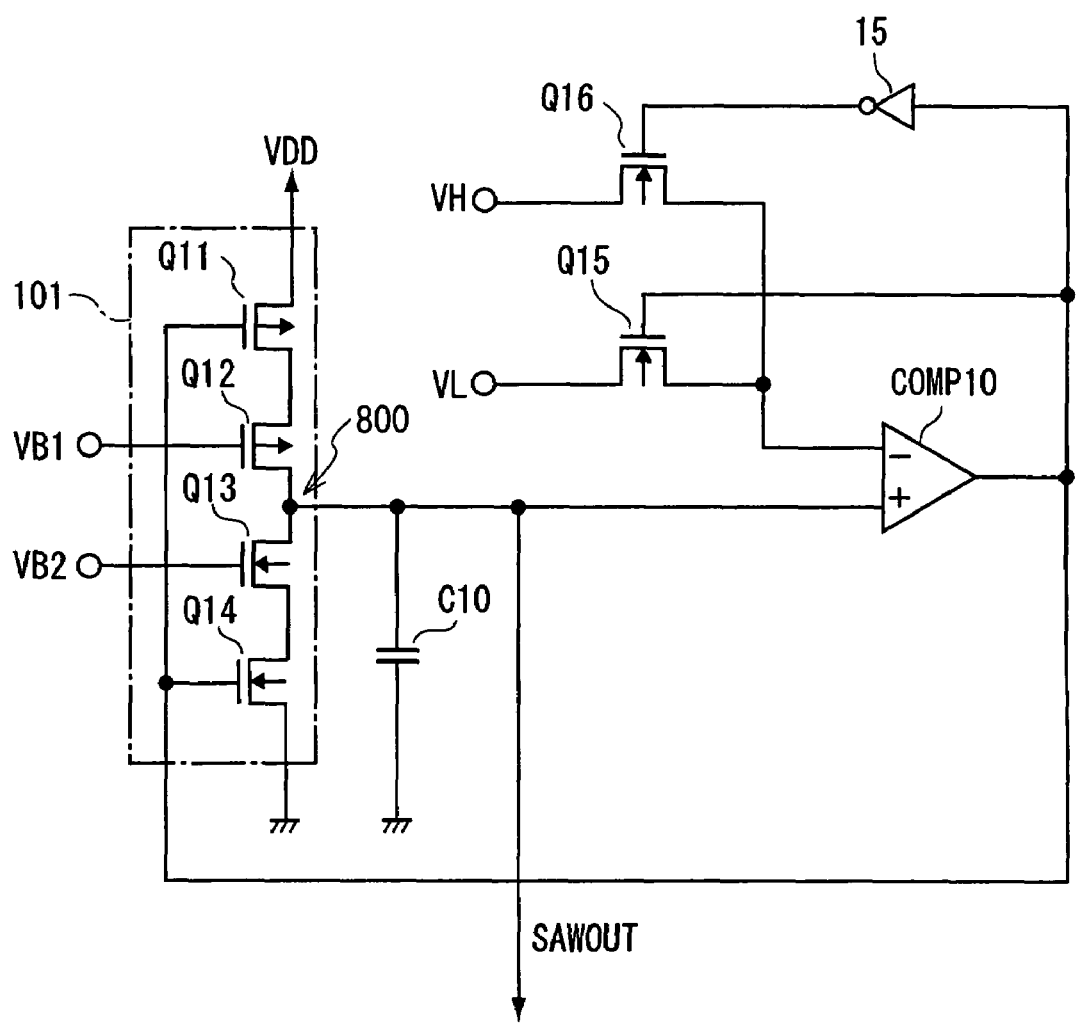
FIG. 5 is a circuit diagram showing an example of a triangular wave generating circuit according to the first embodiment.

The triangular wave generating circuit (SAW) 10 generates a triangular wave SAWOUT (potential VSAW) having a peak potential VH and a bottom potential VL and a predetermined frequency. An exemplary configuration of the circuit is explained with reference to FIG. 5. However, any other triangular wave generating circuit known in the art can be applied to the present embodiment. FIG. 5 is a circuit diagram showing an example of the triangular wave generating circuit 10. The circuit 10 includes a current generating circuit 101, a capacitor C10, a comparator COMP10, an inverter 15, and NMOS transistors Q15 and Q16.

The current generating circuit 101 includes a PMOS transistor Q12 and an NMOS transistor Q13 connected to each other in series, a PMOS transistor Q11 serially connected between a power line (power voltage VDD) and the PMOS transistor Q12, and an NMOS transistor Q14 serially connected between the NMOS transistor Q13 and the ground. An output (control voltage) of a comparator COMP10, which will be described later, is applied at gate terminals of the PMOS transistor Q11 and the NMOS transistor Q14. Due to this configuration, the current generating circuit 101 generates a current for charging/discharging based on the control voltage applied by the comparator 10.

At the gates of the PMOS and NMOS transistors Q12 and Q13, bias voltages VB1 and VB2 are respectively applied. Thus, the PMOS transistor Q12 and the NMOS transistor Q13 are constantly in an ON state. The PMOS transistor Q12 and the NMOS transistor Q13 are provided in order to remove noise. Resistance between the source and the drain of the PMOS transistor Q12 or resistance between the source and the drain of the NMOS transistor Q13 forms a CR circuit with the capacitance of the capacitor C10, which will be described later. Therefore, noise entering the inside of the triangular wave generating circuit 10 can be removed.

Here, a node located at the position where the PMOS transistors Q12 and Q13 are connected to each other is denoted by a node 800 (see FIG. 5). The capacitor C10, one of the terminals of which is connected to the ground, is connected at the node 800. When the current generating circuit 101 conducts a charging operation, i.e., when the PMOS transistor Q11 turns on, the capacitor C10 is charged by the current output from the current generating circuit 101.

Thus, the potential of the node 800 rises. That is, the ascending line of the triangular wave SAWOUT is formed. At this time, the NMOS transistor Q14 is in an OFF state.

When the current generating circuit 101 conducts a discharging operation, i.e., when the NMOS transistor Q14 turns on, accumulated charge in the capacitor C10 flows to the ground through the current generating circuit 101. Thus, the potential of the node 800 decreases. That is, the descending line of the triangular wave SAWOUT is formed. At this time, the PMOS transistor Q11 is in OFF state. The triangular wave generating circuit 10 outputs the triangular wave SAWOUT by repeatedly performing the charging/discharging operations.

The bottom potential VL of the triangular wave SAWOUT is applied at the drain of the NMOS transistor Q15. The output of the comparator COMP10 is connected at the gate of the NMOS transistor Q15. The peak potential VH of the triangular wave SAWOUT is applied at the drain of the NMOS transistor Q 16. The output of the comparator COMP10 is connected via the inverter 15 at the gate of the NMOS transistor Q16. At the comparator COMP10, the non-inverting input terminal thereof is connected to the node 800 and the inverting input terminal thereof is connected to the sources of the NMOS transistors Q15 and Q16.

During a period when the potential V800 of the node 800 is higher than the potential VL, the current generating circuit 101 conducts a discharging operation because the comparator COMP10 outputs the H level. That is, the NMOS transistor Q14 turns on and the accumulated charge in the capacitor C10 flows out. This discharging operation continues until the potential V800 of the node 800 reaches a value corresponding to the potential VL, i.e., until the two potentials input to the comparator COMP10 correspond to each other. Accordingly, the triangular wave SAWOUT having a bottom potential VL is generated.

During a period when the potential V800 of the node 800 is lower than the potential VH, the current generating circuit 101 conducts a charging operation because the comparator COMP10 outputs the L level. That is, the PMOS transistor Q11 turns on and the capacitor C10 accumulates charge.

This charging operation continues until the potential V800 of the node 800 reaches a value corresponding to the potential VH, i.e., until the two potentials input to the comparator COMP10 correspond to each other. Accordingly, the triangular wave SAWOUT having a peak potential VH is generated.

[Exemplary Configuration of Replica Circuit 20]

Next, an exemplary configuration of a replica circuit 20 is described with reference FIG. 4. In FIG. 4, the replica circuit 20 is a circuit that reproduces a potential simulating a potential that flows through the inductor L1, particularly in the light load mode of the switching regulator 1. Referring to FIG. 4, the replica circuit 20 comprises: a PMOS transistor Q3 (third switch element); an NMOS transistor Q4 (fourth switch element); a resistor R1 (first resistance element); a capacitor C2 (first capacitor); and a switch element SW1 (fifth switch element). The replica circuit 20 reproduces a potential simulating the signal waveform of the current IL passing through the inductor L1, at the node 902 having a potential VREP. For this purpose, the replica circuit 20 is configured with the PMOS transistor Q3, the NMOS transistor Q4, and a CR circuit in which the potential VREP at the node 902, i.e., the higher potential side terminal of the capacitor C2, is changed by operation of the switch element SW1. Here, as the capacitor C2, the capacitance of an MOS transistor may be used. The potential VREP at the node 902 corresponds to the referential potential of the present invention.

In the replica circuit 20 shown in FIG. 4, the source of the PMOS transistor Q3 is connected to the input terminal IN having an input potential VIN and the drain of the PMOS transistor Q3 is connected to the node 901. The gate of the PMOS transistor Q3 is connected to the output terminal of the comparator COMP1 via the inverters 42 and 44. Therefore, the PMOS transistor Q3 operates (turns on/off) in conjunction with the PMOS transistor Q1. The ground potential VGND is applied at the source of the NMOS transistor Q4, and the drain of the NMOS transistor Q4 is connected to the node 901. The gate of the NMOS transistor Q4 is connected to the output terminal of an NOR circuit 39 in the control circuit 30. In the switching regulator 1, the gate of the NMOS transistor Q2 is similarly connected to the output terminal of the NOR circuit 39. Therefore, the NMOS transistor Q4 operates (turns on/off) in conjunction with the NMOS transistor Q2.

One of the terminals of the resistor R1 is connected to the node 901 and the other terminal of the resistor R1 is connected to the node 902. One of the terminals of the switch element SW1 is connected to the node 902 and the other terminal of the switch element SW1 is connected to the output terminal VOUT. The switch element SW1 operates according to the output signal of the NOR circuit 38 in the control circuit 30. That is, the switch element SW1 turns on when the output signal of the NOR circuit 38 is H level and turns off when the output signal of the NOR circuit 38 is L level. Operation of the replica circuit 20 will be described later.

In the switching regulator 1, the potential VREP in the replica circuit 20 is input at the non-inverting terminal of the comparator COMP2, the output potential VOUT is input at the inverting terminal of the comparator COMP2, and the comparator COMP2 outputs a signal SC2 whose logical level accords to the result of the comparison between the potential VREP and the output potential VOUT. Then, the signal SC2 is input to the control circuit 30 and, specifically, to an inverter 33.

[Exemplary Configuration of Control Circuit 30]

Next, an exemplary configuration of the control circuit 30 as a switch controlling portion is described with reference to FIG. 4. In the switching regulator 1 of the present embodiment, the following two functions F1 and F2 are required of the control circuit 30. The circuit configuration of the control circuit 30 is not limited to the exemplary circuit shown in FIG. 4 as long as the functions F1 and F2 are fulfilled.

(Function F1)

The control circuit 30 is required to conduct controls according to the following table and corresponding to periods P1-P3. In the switching regulator 1 of the present embodiment, the input to the control circuit 30 differs in each period. In the heavy load mode, periods P1 and P2 occur cyclically in the sequence P1→P2→P1→P2→ and so on. In the light load mode, periods P1-P3 occur cyclically in the sequence P1→P2→P3→P1→ and so on. Here, "indeterminate" during the period P3 means that the output signal SC2 of the comparator COMP2 may have either the H level or the L level since the output potential VOUT is input to both of the inverting terminal and the non-inverting terminal of the comparator COMP2.

TABLE 1

|        | Input |                                    | Control result |                  |
|--------|-------|------------------------------------|----------------|------------------|
| Period | SC1   | SC2                                | Transistor Q2, Q4 | Switch element SW1 |
| P1     | L     | Constantly H                       | OFF            | OFF              |
| P2     | H     | H                                  | ON             | OFF              |
| P3     |       | Indeterminate after once becoming L | OFF            | ON               |

(Function 2)

The control circuit 30 is required to hold the results of previous controls after the processing enters period P3 in the light load mode, i.e., from once the switch element SW1 turns on until the signal SC1 becomes L level again, i.e., until the processing returns to period P1.

To fulfill the above two functions F1 and F2, in the example shown in FIG. 4, the control circuit 30 comprises a delay circuit 31, inverters 32 and 33, NAND circuits 34-37 having two inputs, and NOR circuits 38 and 39 having two inputs.

A signal having a level that is inverted with respect to the level of the signal SC1, is input via the inverter 42 to the delay circuit 31 and the inverter 32.

The NOR circuits 38 and 39 constitute outputs of the control circuit 30. The output terminal of the NOR circuit 38 is connected to the switch SW1. The switch SW1 turns on when the output level S38 of the NOR circuit 38 is the H level and turns off when the output level S38 of the NOR circuit 38 is the L level. The output terminal of the NOR circuit 39 is connected to the gates of the NMOS transistors Q2 and Q4. In following description, "output logic" of the control circuit means a logic level of the output signals S38 and S39 of the NOR circuits 38 and 39.

Further, in the control circuit 30 shown in FIG. 4, an RS flip-flop circuit is formed by the NAND circuits 36 and 37 to hold the necessary output logic level in order to achieve the function F2.

In following description, operation of the control circuit 30 shown in FIG. 4 during each of the above periods is explained.

First, during the period P1, because the output signal SC1 of the comparator COMP1 is the L level, the H level is input to the NOR circuits 38 and 39 via the inverter 42 and, thus, both of the signal S38 an S39 become the L level. Therefore, as seen in Table 1, the NMOS transistors Q2 and Q4 turn off and the switch element turns off.

The period P2 is a period during which the output signal SC1 of the comparator COMP1 is the H level and the output signal SC2 of the comparator COMP2 remains the H level. That is, the period P2 is a period during which the NMOS transistor Q4 begins to turn on while the potential VREP of the node 902 remains higher than the output potential VOUT, in the replica circuit 20.

During the period P2, between the output signal SC1 switching to the H level and the delay period due to the delay circuit 31 elapsing, the output signal S31 remains the H level. Therefore, the input signals S34 and S35 of the RS flip-plop, which is composed of the NAND circuits 36 and 37, become the L level and the H level, respectively, and the output signals S36 and S37 of the RS flip-flop become the H level and the L level, respectively. As a result, the signals S38 and S39 become the L level and the H level, respectively. Therefore, as seen in Table 1, the NMOS transistors Q2 and Q4 turn on, and the switch element SW1 turns off. After that, when the delay period due to the delay circuit 31 has elapsed, the output signal S31 of the delay circuit becomes the L level. Both of the input signals S34 and S35 of the RS flip-plop, which is composed of the NAND circuits 36 and 37, become the H level. Therefore, the output logic of the control circuit 30 is held. That is, the signals S38 and S39 remain the L level and the H level, respectively.

The period P3 is a period during which the output signal SC1 of the comparator COMP1 is the H level and is a period after once the output signal SC2 of the comparator COMP2 has become the L level. That is, the period P3 is a period after the NMOS transistor Q4 has turned on, and after discharging of the capacitor C2 has proceeded and the potential VREP of the node 902 has become lower than the output potential VOUT, in the replica circuit 20.

During the period P3, the output signal SC2 of the comparator COMP2 becomes the L level. Then, the output signals S34 and S35 of the RS flip-flop, which is formed by the NAND circuits 36 and 37, become the H level and the L level, respectively, and the input signals S34 and S35 of the RS flip-flop change to the L level and the H level, respectively. As a result, the signals S38 and S39 become the H level and the L level, respectively. Therefore, as seen in Table 1, the switch element SW1 turns on and the NMOS transistors Q2 and Q4 turn off.

At this time, once the switch element turns on, the output potential VOUT is input to both of the non-inverting input terminal and the inverting input terminal of the comparator COMP2. Therefore, the logic level of the output signal SC2 of the comparator COMP2 becomes indeterminate. Although the signal SC2 may invert from the L level to the H level, in such a case, the output logic of the control circuit 30 is held since both of the input signals S34 and S35 become the H level. That is, the signals S38 and S39 are held at the H level and the L level, respectively. The holding of the output logics is maintained until the output signal SC1 of the comparator COMP1 is switched to the L level, i.e., the processing is switched to the period P1, and is released when the level of the signal S34, which is one of the input signals of the RS flip-chip, changes.

As described above, the control circuit 30 shown in FIG. 4 is configured so as to fulfill the above functions F1 and F2.

[Operation of Replica Circuit 20]

Figure 6A:
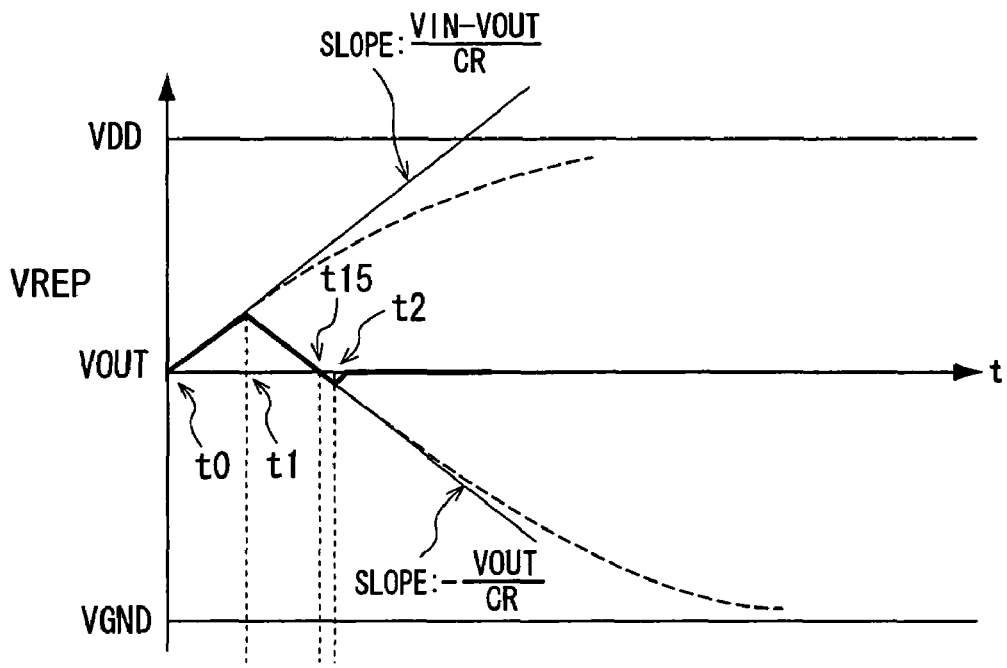
FIG. 6A is a signal wave diagram showing an operation of a replica circuit.
Figure 6B:
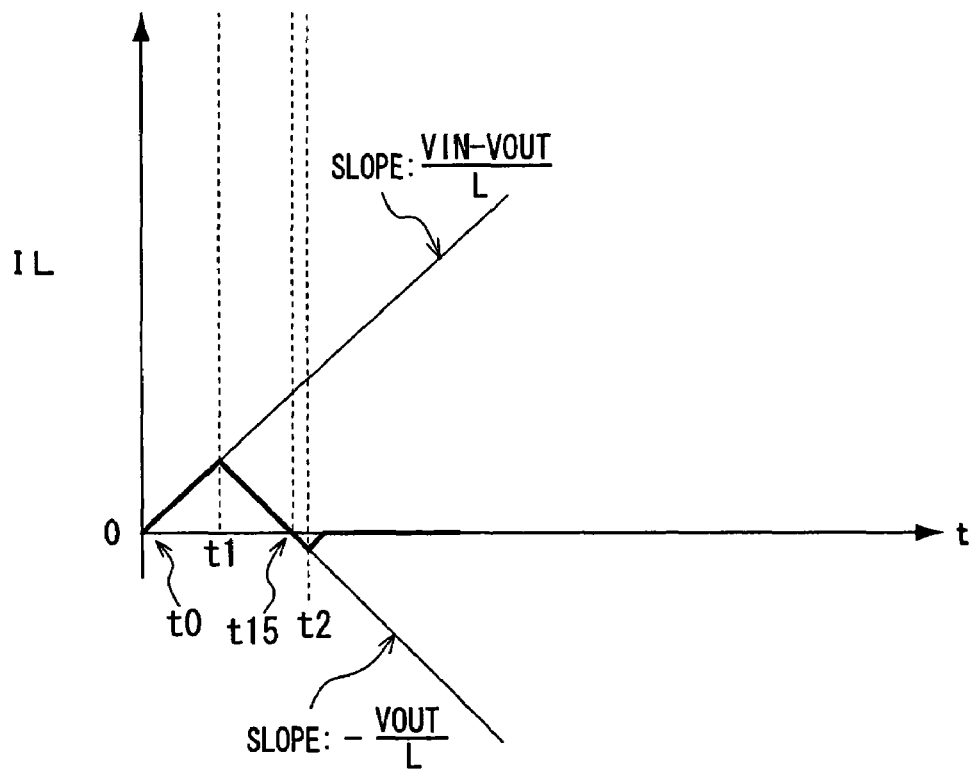
FIG. 6B is a signal wave diagram showing an operation of a replica circuit.

Next, to explain how the replica circuit 20 can reproduce the signal waveform of the current IL passing through the inductor L1 in the light load mode, operation of the replica circuit 20 is explained with reference to FIG. 6. FIG. 6 is a diagram showing a signal waveform in order to explain the operation of the replica circuit 20. FIG. 6A shows the potential VREP of the node 902, and FIG. 6B shows the current IL. In FIG. 6, the period from time t0 to time t1 corresponds to the period P1 in Table 1 and the period from time t1 to time t2 corresponds to the period P2 in Table 1.

Below, the operation of the replica circuit 20 during (A) the period P1 and (B) the period P2 is explained separately in turn. Here, the resistance of the resistor R1 is denoted by R, the capacitance of the capacitor C2 is denoted by C, and the inductance of the inductor L1 is denoted by L.

(A) Period P1 (VOUT<VSAW)

When the output potential VOUT is lower than the potential VSAW, the PMOS transistors Q1 and Q3 turn on because the signal SC1 is the L level. Further, by the operation of the control circuit 30, the NMOS transistor Q4 turns off and the switch element SW1 turns off (refer to Table 1). Therefore, in the replica circuit 20, a current flows from the input terminal IN to the capacitor C2 via the resistor R1, and the capacitor C2 is charged.

By the operation of the control circuit 30, the switch SW1 turns on just before the signal SC1 switches to the L level (refer to Table 1, period P3).

Therefore, at the time when the signal SC1 switches to the L level (at time t0 in FIG. 6), the potential VREP of the node 902 has become the output potential VOUT. Accordingly, the potential VREP of the node 902 after the switch SW1 turns off is expressed by following equation (1).

$$VREP=(VIN-VOUT)\cdot(1-\exp(-t/CR)) \quad (1)$$

Here, in the equation (1), the time t is counted from a reference time t0 when the signal SC1 becomes the L level, i.e., the time when the switch element SW1 turns on.

From the above equation (1), during a relatively short period from the time t0, the changing rate of the potential VREP is expressed by following equation (2).

$$dVREP/dt = (VIN - VOUT)/CR \cdot \exp(-t/CR) \quad (2)$$
$$\approx (VIN - VOUT)/CR \quad (t \approx 0)$$

Therefore, as seen in FIG. 6A, the potential VREP changes from the potential VOUT at time t0 with a slope of (VIN−VOUT)/CR.

Further, when the output potential VOUT is lower than the potential VSAW, as described above, the current IL flowing through the inductor L1 from the input terminal IN (input potential VIN) to the output terminal VOUT (output potential VOUT) increases since the PMOS transistor Q1 turns on and the NMOS transistor Q2 turns off. The changing rate of the current IL can be expressed by the following equation (3).

$$dIL(t)/dt=(VIN-VOUT)/L \quad (3)$$

The PMOS transistor Q1 is in an off state and the NMOS transistor Q2 is in an off state just before the signal SC1 switches to the L level (period P3) due to the operation of the control circuit 30 (refer to Table 1). Therefore, the current IL is 0 [A] at the time at which the signal SC1 switches to the L level (at time t0 in FIG. 6). Accordingly, as seen in FIG. 6B, the current IL changes from 0 [A] at time t0 with a slope of (VIN−VOUT)/L.

As is apparent from a comparison of the above equations (2) and (3), during the period P1 (when output potential VOUT<potential VSAW), both of the potential VREP in the replica circuit 20 and the current IL passing through the inductor L1 begin to change at the time t0 when the signal SC1 becomes the L level with a slope proportional to the difference between the input potential VIN and the output potential VOUT (VIN−VOUT).

(B) Period P2 (VOUT≧VSAW)

During the period P2, the output potential VOUT is equal to or larger than the potential VSAW, and the PMOS transistors Q1 and Q3 turn off because the signal SC1 is the H level. Further, due to the operation of the control circuit 30, the NMOS transistors Q2 and Q4 turn on and the switch element SW1 turns off (refer to Table 1). Therefore, in the replica circuit 20, accumulated charge in the capacitor C2 is discharged to the ground via the resistor R1 and the NMOS transistor Q4.

At this time, given that the potential VREP of the node 902 at the time when the NMOS transistor Q4 turns on (time t1 in FIG. 6) is VREP_0, the potential VREP after that time is expressed by following equation (4).

$$VREP = VREP\_0 \cdot \exp(-t/CR) \quad (4)$$

Here, in equation (4) the time t is counted from a reference time t1 that is a time when the period P2 starts.

At this time, in the light load mode of the switching regulator 1, the potential VREP_0 of the node 902 just after the NMOS transistor Q4 turns on is very close to the output potential VOUT since the period from the t0 to t1 is very short.

Therefore, from the above equation (4), the changing rate of the potential VREP during a relatively short period counted from the time t1 can be approximately expressed by the following equation (5).

$$dVREP/dt = -(VREP\_0/CR) \cdot \exp(-t/CR) \quad (5)$$
$$\approx -(VREP\_0/CR) \quad (t \approx 0)$$
$$\approx -(VOUT/CR)$$

Accordingly, as seen in FIG. 6A, the potential VREP begins to change at time t1 with a slope of −(VOUT/CR).

In contrast, during the period P2, as described above, the current IL that flows through the inductor L1 from the input terminal IN (input potential: VIN) to the output terminal VOUT (output terminal: VOUT) decreases because the PMOS transistor Q1 is turned off and the NMOS transistor Q2 is turned on. The changing rate of the current IL can be expressed by following equation (6).

$$dIL(t)/dt = -VOUT/L \quad (6)$$

Accordingly, as seen in FIG. 6B, the current IL begins to change at time t1 with a slope of −(VOUT/L).

As is apparent from a comparison of the above equations (5) and (6), during the period P2, both of the potential VREP in the replica circuit 20 and the current IL passing through the inductor L1 begin to change at the time t1 when the signal SC1 becomes the H level with a slope proportional to the output potential VOUT.

Further explanation is made with reference to FIG. 6. As described above, at the time t0, the potential VREP begins to change from an initial output potential VOUT, and the current IL begins to change from a starting point of 0 [A] as a. After that, during a period from t0 to t1 (period P1), the ratio of the ascending slope of the potential VREP to that of the current IL is a value which can be determined by the ratio of CR to L irrespective of the value of the input potential VIN and the output potential VOUT. Similarly, during a period from t1 to t2 (period P2), the ratio of the descending slope of the potential VREP to that of the current IL is a value which can be determined by the ratio of CR to L.

Therefore, although the absolute values of the ascending or descending slopes of the potential VREP and the current IL are different from each other, the timing at which the potential VREP returns to the output potential VOUT and the timing at which the current IL returns to 0 [A] correspond to each other (time t15 in FIG. 6). In FIG. 6, at time t15, the comparator COMP2 detects a time when the potential VREP becomes lower than the output potential VOUT (VREP<VOUT). Then, at time t2, the comparison result by the comparator COMP2 is reflected in the output of the control circuit 30 and the NMOS transistor Q2 turns off.

The signal waveform of the current IL passing through the inductor L1 is reproduced by the potential VREP in the replica circuit 20 as described above with reference to FIG. 6. Therefore, the switching regulator 1 of the present embodiment can detect a timing when the current IL becomes less than 0 [A], i.e., when the current IL flows in reverse, by comparing the potential VREP and the output potential VOUT at the comparator COMP2.

[Operation of Switching Regulator]

Figure 7:
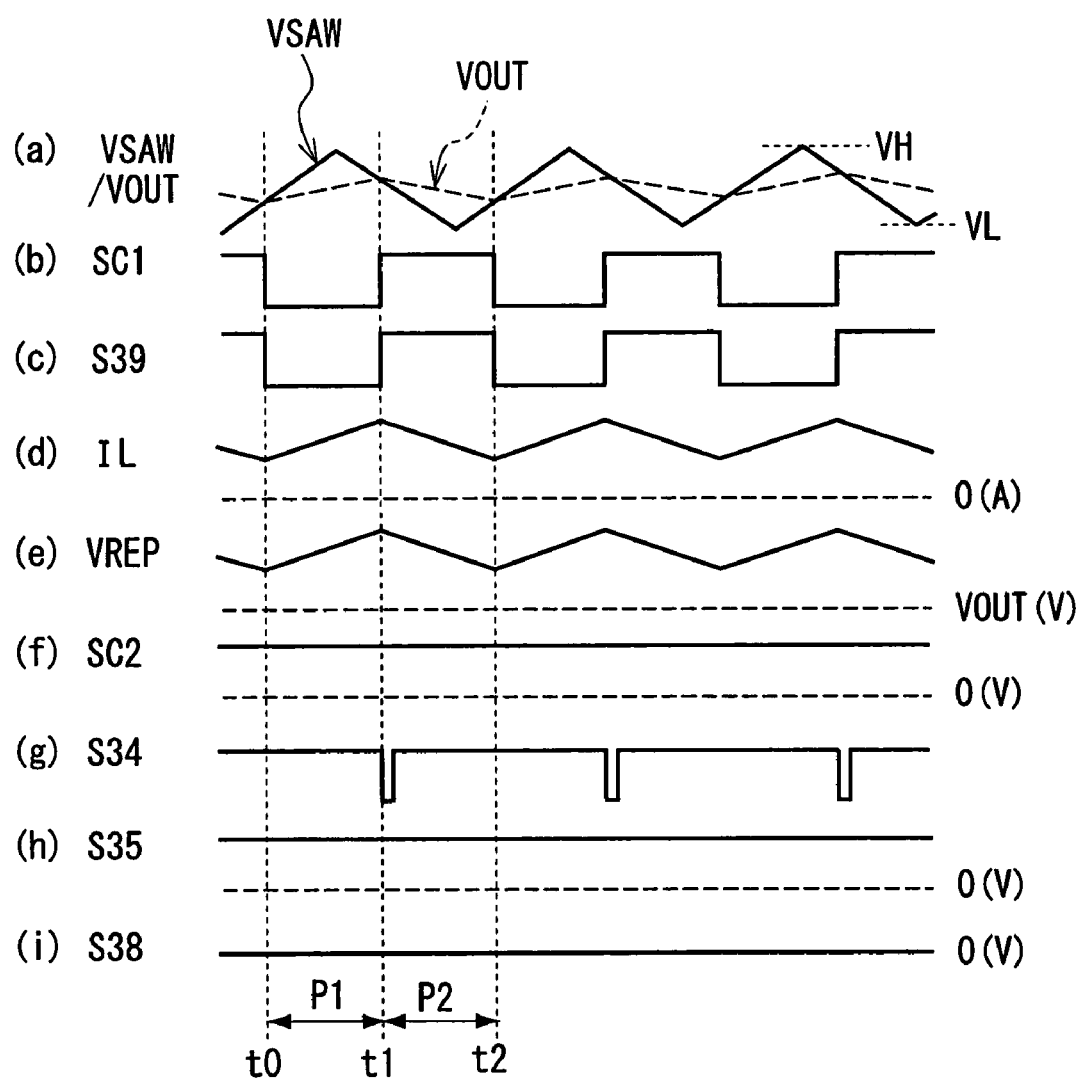
FIG. 7 is a timing chart showing an operation of the switching regulator of the first embodiment at the time of a heavy load operation.
Figure 8:
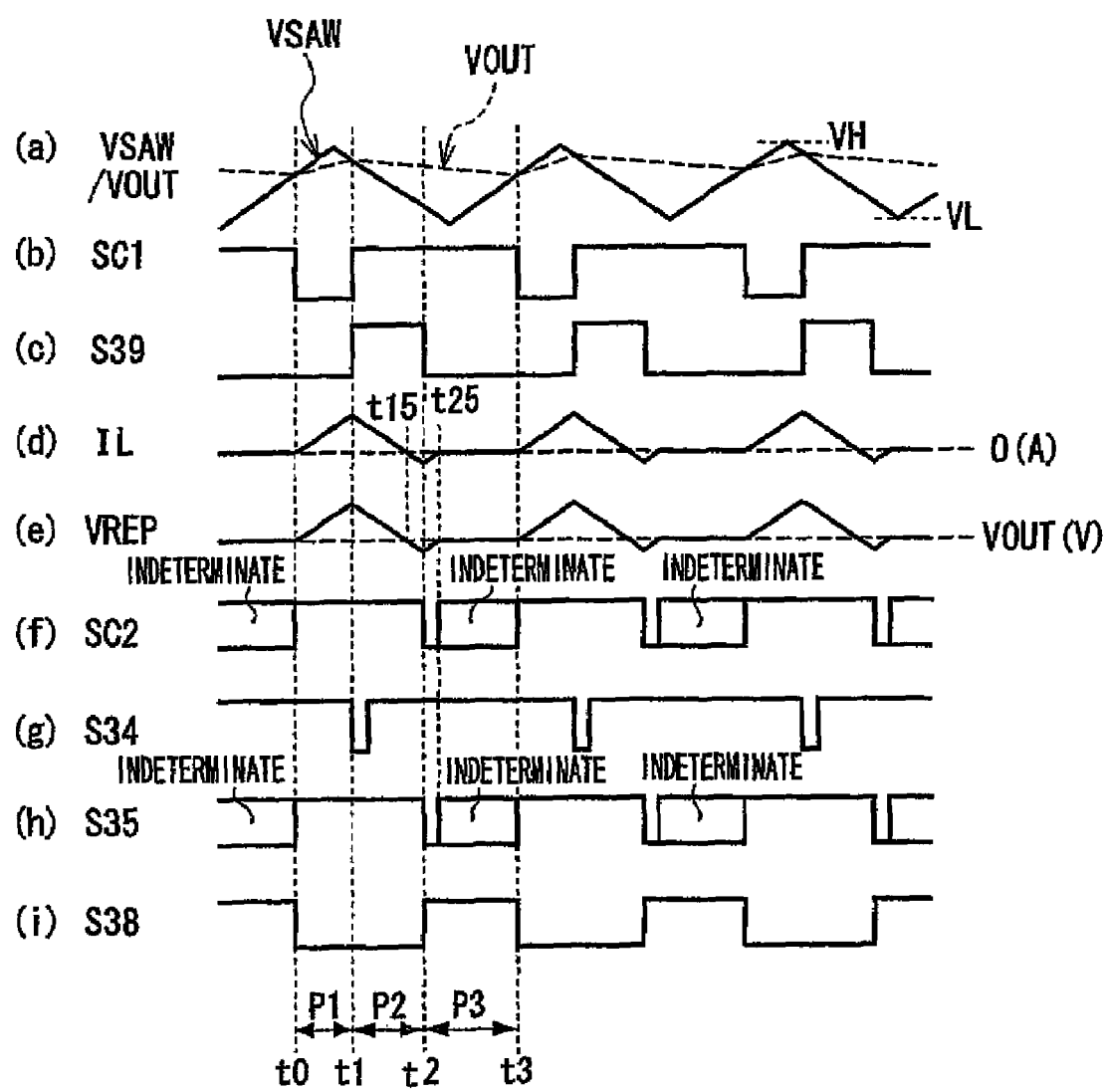
FIG. 8 is a timing chart showing an operation of the switching regulator of the first embodiment at the time of a light load operation.

Next, with reference to FIGS. 7 and 8, the operation of the switching regulator 1 of the present embodiment in the heavy load mode and the light load mode will be described separately. FIG. 7 is a timing chart showing waveforms of signal waves at each section of the switching regulator 1 in the heavy load mode. FIG. 8 is a timing chart showing waveforms of signal waves at each section of the switching regulator 1 in the light load mode. Here, in the drawings, the period from t0 to t1 is the period P1, the period from t1 to t2 is the period P2, and the period from t2 to t3 is the period P3.

<Heavy Load Mode>

(Period P1)

In FIG. 7, when the time t0 has elapsed, the output potential VOUT becomes lower than the potential VSAW (VOUT<VSAW) (see (a) in FIG. 7), and the output signal SC1 of the comparator COMP1 changes from the H level to the L level (see (b) in FIG. 7). Therefore, the PMOS transistors Q1 and Q3 turn on. The current passing through the inductor L1 increases by the amount of a current flowing from the input terminal IN via the PMOS transistor Q1 (see (d) in FIG. 7). In the control circuit 30, both of the input signals S34 and S35 of the RS flip-flop, which is formed by NAND circuits 36 and 37, are at the H level. At the NOR circuits 38 and 39, the H level is input via the inverter 42, and both of the signals S38 and S39 are at the H level (see (i) and (c) in FIG. 7). Therefore, the NMOS transistors Q2 and Q4 turn off, and the switch element SW1 turns off. In the replica circuit 20, a current flows from the input terminal IN to the capacitor C2 via the PMOS transistor Q3 and the resistor R1, and the capacitor C2 is charged. Therefore, the potential VREP rises in conjunction with the current IL passing through the inductor L1 (see (e) in FIG. 7). In the light load mode, during the period P1, the potential VREP is higher than the output potential VOUT and the output signal SC2 of the comparator COMP2 is constantly at the H level.

(Period P2)

In FIG. 7, when the time t1 elapses, the output potential VOUT becomes equal to or higher than the potential VSAW (VOUT≧VSAW) (see (a) in FIG. 7), and the output signal SC1 of the comparator COMP1 changes from the L level to the H level (see (b) in FIG. 7). Therefore, the PMOS transistors Q1 and Q3 turn off. In the control circuit 30, from the time t1 until the delay time passes, the input signals S34 and S35 of the RS flip-flop, which is formed by the NAND circuits 36 and 37, become the L level and the H level, respectively (see (g), (h) in FIG. 7). Therefore, the signals S38 and S39 become the L level and the H level, respectively (see (i), (c) in FIG. 7). After the delay time of the delay circuit 31 elapses, the signal S34 becomes the H level (see (g), (h) in FIG. 7). However, the signals S38 and S39 are held in the L level and the H level, respectively. Therefore, during the period P2, the NMOS transistors Q2 and Q4 turn on, and the switch element SW1 turns off. Since the NMOS transistor Q2 turns on, the current passing through the inductor toward the output terminal VOUT decreases (see (d) in FIG. 7). In the replica circuit 20, accumulated charge in the capacitor C2 is discharged to the ground via the resistor R1 and the NMOS transistor Q4. Therefore, the potential VREP lowers in conjunction with the current IL passing through the inductor L1 (see (e) in FIG. 7). In the heavy load mode, during the period P2, the potential VREP is higher than the output potential VOUT, and the output signal SC2 of the comparator COMP2 is constantly at the H level (see (f) in FIG. 7).

As shown in FIG. 7, in the heavy load mode of the switching regulator 1, operations during the above periods P1 and P2 are repeated in sequence.

<Light Load Mode>

(Periods P1 and P2)

In FIG. 8, before t0, i.e., during the periods P1 and P2, since the logic level imparted to each switch element is unchanged from the heavy load mode, the operation at each section of periods P1 and P2 in the light load mode is the same as in the heavy load mode as shown in FIG. 8; however, the current IL flowing through the inductor L1 and the signal waveform of the potential VREP in the replica circuit 20 are different to during the heavy load mode. In FIG. 8, before the time t0 at which the period P1 begins, i.e., during the period P3, as described later, the switch element SW1 turns on and, thus, the potential VREP equals the output potential VOUT. Further, both of the PMOS transistor Q1 and the NMOS transistor Q2 turn off and, thus, the current IL passing through the inductor L1 is 0 [A]. Therefore, as seen in FIG. 8, at the time t0, the potential VREP begins to change from the output potential VOUT and the current IL begins to change from 0 [A] (see (d), (e) in FIG. 8).

After this, both of the current IL and the potential VREP increase during the period P1 and decrease during the period P2 (see (d), (e) in FIG. 8).

Further, as described with reference to FIG. 6, although the absolute values of the ascending or descending slopes of the potential VREP and the current IL are different from each other, the timing when the potential VREP returns to the output potential VOUT and the timing when the current IL returns to 0 [A] correspond to each other during the period P2 (time t15 in FIG. 8). Here, the difference between the time t15 at which the potential VREP becomes lower than the output potential VOUT and the time t2 at which the output signal SC2 of the comparator COMP2 changes to the L level is due to the operational delay of the comparator COMP2.

(Period P3)

At the time t2, although the output signal of the comparator COMP1 is still at the H level (see (b) in FIG. 8), the detection of status "potential VREP<output potential VOUT" by the comparator COMP1 is reflected in the output of the comparator COMP2. That is, at the time t2, the output signal SC2 of the comparator COMP2 becomes the L level (see (f) in FIG. 8). When the output signal SC2 of the comparator COMP2 becomes the L level, in the control circuit 30, the input signals S34 and S35 of the RS flip-flop, which is formed by the NAND circuits 36 and 37, become the H level and the L level, respectively (see (g), (h) in FIG. 8), and the signals S38 and the S39 become the H level and the L level, respectively (see (i), (c) in FIG. 8). Therefore, the switch SW1 turns on and the NMOS transistors Q2 and Q4 turn off. When the switch element SW1 turns on, the output potential VOUT is input to both of the non-inverting input terminal and the inverting input terminal of the comparator COMP2. Therefore, at the time t25, the logic level of the output signal SC2 of the comparator COMP2 becomes indeterminate (see (f) in FIG. 8). Similarly, the logic level of the signal S35 becomes indeterminate (see (h) in FIG. 8).

During the period P3, since the logic level of output signal SC2 of the comparator COMP2 is indeterminate, it may be inverted from the L level to the H level. However, in such a case, both of the input signals S34 and S35 of the RS flip-flop, which is formed by the NAND circuits 36 and 37, become the H level and the output logic of the control circuit 30 is held. Therefore, the signals S38 and S39 are held at the H level and the L level, respectively (see (i), (c) in FIG. 8). The holding of the output logic continues until the output signal SC1 switches to the L level, i.e., until the processing switches to the period P1, and is released when the level of the signal S34, which is one of the input signals of the RS flip-chip, changes.

As seen in FIG. 8, in the light load mode of the switching regulator 1, operations during the above periods P1 to P3 are repeated in sequence.

As described above, the switching regulator 1 of the present embodiment generates a potential VREP simulating a waveform of the current passing through the inductor L1 at the replica circuit 20 and monitors the results of a comparison between the potential VREP and the output potential VOUT.

Further, the switching regulator 1, particularly in the light load mode, detects a timing when the current IL passing through the inductor L1 becomes less than 0 [A] to turn off the NMOS transistor Q2, based on the result of the comparison. Therefore, in the switching regulator 1, power loss due to the reversed flow of the current passing through the inductor L1 to the NMOS transistor Q2, i.e., the power loss generated by the ON resistance of the NMOS transistor Q2 is extremely small and, thus, the efficiency of the switching regulator is high.

Further, in the switching regulator 1, the detection of the timing, when the current passing through the inductor L1 falls to below 0 [A], is conducted at a relatively high potential VREP. Therefore, even if the comparator COMP2 has an offset variation, the influence of the offset variation on the comparison results is extremely small. In this regard, the switching regulator 1 of the present embodiment is significantly different from the referential device 500, in which the offset variation of the comparator COMP3 affects the comparison results to a relatively significant extent (see FIG. 1). It should be noted that the output potential VREP of the replica circuit 20 may be set higher within a range that the VREP does not saturate the power supply potential VDD (see FIG. 6) so as to reduce the influence of the offset variation of the comparator COMP3 on the comparison results.

Second Exemplary Embodiment

The second exemplary embodiment of the switching regulator of the present invention will be described below. FIG. 9 is a circuit diagram of the switching regulator 2 of the second embodiment. Element identical to those of the switching regulator 1 shown in FIG. 4 are indicated by the same numerals and description thereof is omitted.

Although the switching regulator 1 of the first embodiment has extremely high efficiency, there may be cases in which the current IL passing through the inductor L1 does not become completely 0 [A] in the light load mode, even after both of the PMOS transistor Q1 and the NMOS transistor Q2 turn off, due to discrepancies in the operational timings of the respective switch elements, variations of loading current and the like. In the switching regulator 2 of the present embodiment, even when the current IL passing through the inductor L1 does not become completely 0 [A], the efficiency can be improved by conserving energy in the inductor L1.

As seen in FIG. 9, in the switching regulator 2, an NMOS transistor Q5 (sixth switch element) and a buffer 44 are added to the switching regulator 1 of the first embodiment. As shown in FIG. 9, the drain of the NMOS transistor Q5 is connected to one of the terminals of the inductor L1 (at the side of the output terminal VOUT), and the source of the NMOS transistor Q5 is connected to the other one of the terminals of the inductor L1. The buffer 44 is disposed between the gate of the NMOS transistor Q5 and the output terminal of the NOR circuit 38 so as to be connected thereto.

In the switching regulator 2, during the period P3, the output signal 38 of the NOR circuit 38 becomes the H level, the switch element SW1 turns on, and, at the same time, the NMOS transistor Q5 turns on. Therefore even in a case when the current IL passing through the inductor L1 does not become completely 0 [A] even though both of the PMOS transistor Q1 and the NMOS transistor Q2 turn off during the period P3, the NMOS transistor Q5 turns on, a current loop is formed by the inductor L1 and the source and the drain of the NMOS transistor Q5, and energy is conserved in the inductor L1. At this time, the voltage of both terminals of the inductor L1 is smaller since the voltage is a product of the ON resistance of the NMOS transistor Q5 and the current IL and, thus, the rate of change in the current IL is also small.

As explained above, the switching regulator 2 of the present embodiment can improve the efficiency to a greater extent than the switching regulator 1 of the first embodiment.

Third Exemplary Embodiment

Figure 10:
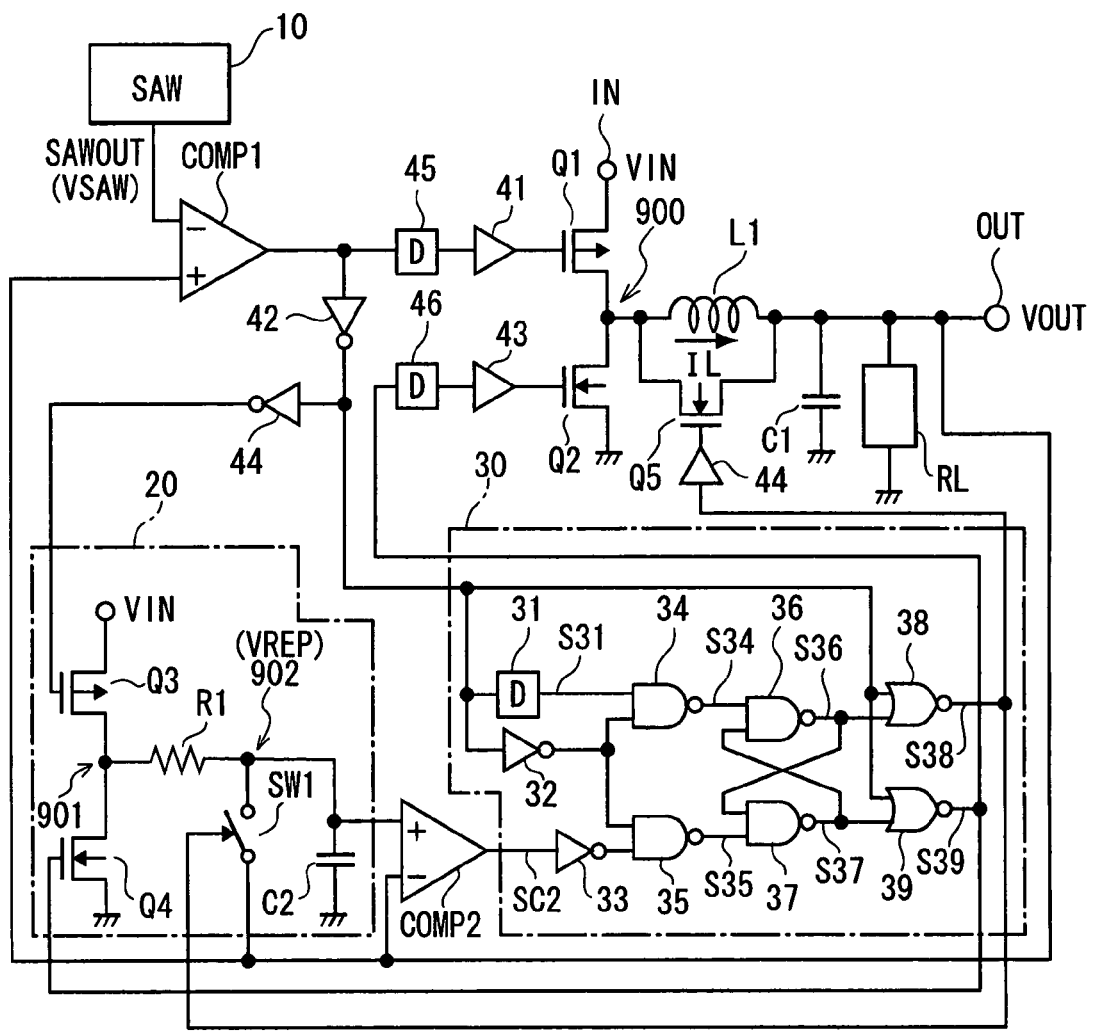
FIG. 10 is a circuit diagram of a switching regulator according to a third embodiment.

The third exemplary embodiment of the switching regulator of the present invention will be described below. FIG. 10 is a circuit diagram of the switching regulator 3 of the third embodiment. Elements identical to those of the switching regulators 1 and 2 are indicated by the same numerals and description thereof is omitted.

As seen in (d) of FIG. 8, in the switching regulator 1 (also in the switching regulator 2), when the processing proceeds from the period P2 to the period P3, from the time t1 to the time t25, a small reverse current IL (IL<0) is generated. This is because the comparison result of the potential VREP in the replica circuit 20 and the output potential VOUT is input to the control circuit 30 with a delay and, thus, the timing of the NMOS transistor Q2 turning off is delayed. Therefore, in the switching regulator 3 of the present embodiment, in order to prevent the current IL from flowing in reverse due to the operational delay of the comparator COMP2, the current IL is delayed by delaying the operations of the PMOS transistor Q1 and the NMOS transistor Q2 for the delay time due to the operational delay of the comparator COMP2.

In view of the above, in the switching regulator 3, as seen in FIG. 10, a delay circuit 45 and a delay circuit 46 (first and second delay elements) are added at preceding stages to the buffers 41 and 43, respectively, of the switching regulator 2 described above. Here, the delay time of each of the delay circuits 45 and 46 is set to be the same as the operational delay time of the comparator COMP2.

Next, operation of the switching regulator 3 will be described with reference to FIG. 11. FIG. 11 is a timing chart showing waveforms of signals at each portion of the switching regulator 3 in the light load mode. Here, in FIG. 11, as in FIG. 8, the period from time t0 to the time t1 is the period P1, the period from the time t1 to the time t2 is the period P2, and the period from the time t2 to t3 is the period P3.

In FIG. 11, at the time t15, the potential VREP becomes lower than the output potential VOUT. However, the comparison results of this state are not immediately reflected in the output of the control circuit 30 due to the operational delay of the comparator COMP2. After this, at the time t2 when the delay time of the comparator COMP2, i.e., $\Delta t$ (=t2−t15), has elapsed from the time t15, the comparison results of the comparator COMP2 are reflected in the output of the control circuit 30. As a result, at the time t2, the signal S39 becomes the L level (see (c) in FIG. 11) and the NMOS transistor Q2 turns off.

On the other hand, when compared with the switching regulator 1 of the first embodiment, the current IL is delayed overall with respect to the potential VREP by the delay time $\Delta t$ of the delay circuits 45 and 46, and the current IL becomes 0 [A] at time t2 (see (d) in FIG. 11).

Therefore, in the switching regulator 3 of the present embodiment, even when there is an operational delay of the comparator COMP2, the timing at which the current IL becomes 0 [A] and the timing at which the NMOS Q2 turns off correspond to each other at the time t2. Accordingly, reverse flow of the current IL is more effectively prevented than in the first and second embodiments.

As explained above, the switching regulator 3 of the present embodiment can improve the efficiency to a greater extent than the switching regulators 1 and 2 of the first and the second embodiments.

While plural exemplary embodiments are described above, the specific configuration of the present invention is not limited to the present embodiments, and variations in design and other modifications may be included within the scope of the essence of the present invention. For example, the switching regulator of the present invention is not limited to a step-down converter as described above in the exemplary embodiments and may be applied to a step-up converter.

Further, it should be noted that the technical features described in the first to third embodiments may be combined. For example, the delay circuits 45 and 46 in the third embodiment may be applied to the switching regulator 1 of the first embodiment.

What is claimed is:

1. A switching regulator comprising:
a first signal generator that generates a triangular wave;
a first comparator that compares an output potential and a potential of the triangular wave;
a first switch element having one terminal set to have a first reference potential and another terminal connected to a first node, the first switch element operating in response to a comparison result of the first comparator;
a second switch element having one terminal set to have a second reference potential that is lower than the first reference potential, and another terminal connected to the first node, the second switch element operating in response to the comparison result of the first comparator;
an inductor disposed between the first node and an output terminal;

a second signal generator that generates a referential potential that simulates a waveform of a current passing through the inductor, such that at least a timing when the current passing through the inductor becomes substantially zero and a timing when the referential potential becomes substantially the same as the output potential correspond; and a switch controlling portion that sets both of the first switch element and the second switch element to an OFF state when the referential potential becomes lower than the output potential, wherein the second signal generator includes
- a third switch element having one terminal set to have the first reference potential and another terminal connected to a second node, the third switch element operating in conjunction with the first switch element,
- a fourth switch element having one terminal set to have the second reference potential and another terminal connected to the second node, the fourth switch element operating in conjunction with the second switch element,
- a first resistor connected to the second node, and
- a first capacitor connected to the first resistor and being charged/discharged in conjunction with operations of the third switch element and the fourth switch element, wherein a terminal of the first capacitor that is connected to the first resistor is set to have the referential potential.

2. The switching regulator of claim 1, further comprising:
a second comparator having a first input terminal and a second input terminal, the referential potential being input to the first input terminal and the output potential being input to the second input terminal; and
a fifth switch element provided between the first input terminal and the output terminal, wherein when the second comparator detects that the referential potential is lower than the output potential, the switch controlling portion holds the second switch element and the fourth switch element in the OFF state regardless of an output of the second comparator, and holds the fifth switch element in an ON state, after detection.

3. A switching regulator comprising:
a first signal generator that generates a triangular wave;
a first comparator that compares an output potential and a potential of the triangular wave;
a first switch element having one terminal set to have a first reference potential and another terminal connected to a first node, the first switch element operating in response to a comparison result of the first comparator;
a second switch element having one terminal set to have a second reference potential that is lower than the first reference potential, and another terminal connected to the first node, the second switch element operating in response to the comparison result of the first comparator;

an inductor disposed between the first node and an output terminal;
a second signal generator that generates a referential potential that simulates a waveform of a current passing through the inductor, such that at least a timing when the current passes through the inductor becomes substantially zero and a timing when the referential potential becomes substantially the same as the output potential correspond;
a switch controlling portion that sets both of the first switch element and the second switch element to an OFF state when the referential potential becomes lower than the output potential; and
a third switch element coupled across the inductor, wherein the third switch element turns on when the referential potential becomes lower than the output potential.

4. The switching regulator of claim 1, further comprising a fifth switch element coupled across the inductor, wherein the fifth switch element turns on when the referential potential becomes lower than the output potential.

5. The switching regulator of claim 2, further comprising a sixth switch element coupled across the inductor, wherein the sixth switch element turns on when the referential potential becomes lower than the output potential.

6. The switching regulator of claim 2, further comprising:
a first delay element that delays operation of the first switch element; and
a second delay element that delays operation of the second switch element, wherein respective delay times of the first delay element and the second delay element are set to be substantially identical to each other.

7. The switching regulator of claim 3, further comprising:
a first delay element that delays operation of the first switch element; and
a second delay element that delays operation of the second switch element, wherein respective delay times of the first delay element and the second delay element are set to be substantially identical to each other.

8. The switching regulator of claim 4, further comprising:
a first delay element that delays operation of the first switch element; and
a second delay element that delays operation of the second switch element, wherein respective delay times of the first delay element and the second delay element are set to be substantially identical to each other.

9. The switching regulator of claim 5, further comprising:
a first delay element that delays operation of the first switch element; and
a second delay element that delays operation of the second switch element, wherein respective delay times of the first delay element and the second delay element are set to be substantially identical to each other.

* * * * *